United States Patent
Nevius (10) Patent No.: US 11,191,259 B1
(45) Date of Patent: Dec. 7, 2021

(54) FISHING SPOOL TOOL

(71) Applicant: Robert D. Nevius, Key West, FL (US)

(72) Inventor: Robert D. Nevius, Key West, FL (US)

( * ) Notice: Subject to any disclaimer, the term of this patent is extended or adjusted under 35 U.S.C. 154(b) by 269 days.

(21) Appl. No.: 16/428,086

(22) Filed: May 31, 2019

Related U.S. Application Data (60) Provisional application No. 62/679,713, filed on Jun. 1, 2018.

(51) Int. Cl.
  *A01K 89/01* (2006.01)
  *A01K 89/00* (2006.01)

(52) U.S. Cl.
  CPC .................. *A01K 89/003* (2013.01)

(58) Field of Classification Search
  CPC ............ A01K 89/003; A01K 89/01931; A01K 89/045; A01K 89/058
  USPC .................. 242/613, 613.1, 613.2
  See application file for complete search history.

(56) References Cited

U.S. PATENT DOCUMENTS

| | | | | |
|---|---|---|---|---|
| 3,647,155 A * | 3/1972 | Jorgenson | ............ | A01K 89/003 242/401 |
| 4,360,172 A * | 11/1982 | Cope | .................... | A01K 89/003 242/134 |
| 5,056,732 A * | 10/1991 | Nicholson, Jr. | ....... | B65H 54/106 242/470 |
| 5,725,172 A * | 3/1998 | Koehler | ................. | A01K 89/00 242/395 |
| 6,102,319 A * | 8/2000 | Annabel | .............. | A01K 89/003 242/125.1 |
| 8,827,198 B1 * | 9/2014 | Steadman, Sr. | ........ | B65H 75/14 242/608.4 |
| 10,660,321 B2 * | 5/2020 | Tseng | ..................... | B65H 54/72 |
| 10,701,916 B1 * | 7/2020 | Yu | ......................... | B65H 49/327 |
| 2012/0205481 A1 * | 8/2012 | Stout | ..................... | A01K 89/003 242/423.1 |
| 2018/0116193 A1 * | 5/2018 | Rogers | ................. | A01K 89/003 |
| 2019/0075771 A1 * | 3/2019 | Gordon | ................ | A01K 89/003 |

* cited by examiner

*Primary Examiner* — Emmanuel M Marcelo
(74) *Attorney, Agent, or Firm* — John Rizvi; John Rizvi, P.A.—The Patent Professor (57) ABSTRACT

A portable fishing spool tool for quickly, easily and safely re-spooling new fishing line onto any size fishing reel, and unwinding old fishing line from any size fishing reel, in a controlled manner to prevent injury or damage to users or fishing equipment during the process. The fishing spool tool includes a spool mounted on a rod, a tension spring system including a rod collar, and tension collar assembly both mounted on the rod at opposite sides of the spool to permit users to adjust axial tension on the spool to control rotational speed and drag of the spool when adding or removing fishing line. One end of the rod is attachable to a power drill to unwind fishing line, and a pair of suction cups are attachable to opposite ends of the rod to install the spool tool in a receptacle with a ballast for re-spooling fishing line on fishing reels.

20 Claims, 6 Drawing Sheets

FISHING SPOOL TOOL

CROSS-REFERENCE TO RELATED APPLICATIONS

This application is a Non-Provisional Patent Application that claims the benefit of Provisional Patent Application Ser. No. 62/679,731, filed Jun. 1, 2018, which is incorporated by reference herein in its entirety.

FIELD OF THE INVENTION

The present invention relates generally to fishing accessories, and more particularly, to a fishing spool tool for re-spooling new fishing line onto, and unwinding old fishing line from, any size fishing reel where the old fishing line is easily removed for disposal or recycling.

BACKGROUND OF THE INVENTION

Anglers of all ages often enjoy the sport of fishing throughout various bodies of water including oceans, lakes, ponds and streams. The outdoor activity engages individuals to experience the picturesque views of the wide open terrain, to bond with nature, and to seek the thrill of the catch often predicated on the type, size and weight of the fish. Fishing is not only deemed a recreational, and commercial activity, but has become a choice of career for professional fisherman as well. Law abiding anglers are typically apprised of the state and federal laws and rules that govern fishing in prescribed bodies of water. As such individuals are mindful and respectful of such regulations, they typically engage in catching fish for personal consumption, commercial sale, or in accordance with a catch and release program designed to conserve and promote the longevity of certain species. Select businesses also cater to the sport by providing a host of services to people who might be interested in learning how to fish, or in pursuing particular fish of interest. For example, some private businesses provide fishing excursions, have developed stocked lakes and ponds with camp grounds, or have charter businesses that attract anglers desiring to fish for select species of fish found only in ocean waters. Fishing does not only occur in open waters, but also on the ice as well. Ice fishing is also a popular sport enjoyed by some who dare the cold temperatures and whirling winds often experienced on the open landscape of frozen lakes and rivers. As with any sport, fishing generally requires the use of specific equipment that is tailored for catching a wide range of fish species.

The basic necessities needed for fishing generally includes a fishing pole having a fishing reel equipped with fishing line wound on the fishing reel, and tackle including for example, weights, hooks, leaders, and a variety of lures. The type and size of the pole, reel, and tackle typically correlates to the type and size of fish involved. For example, large ocean fish will require, stronger, larger fishing poles having large, heavy duty fishing reels to accommodate catching heavier, large sized ocean fish. A component that anglers often focus on, in preparation for fishing, is the type or condition of fishing line being used. In choosing the right fishing line, anglers often focus on certain factors such as, tension or breaking strength, visibility, castability, UV resistance, or abrasion resistance. Advancements in design and construction of fishing lines have resulted in manufacturers providing a host of fishing line products for use in a wide range of fishing applications. Dedicated anglers realize the need for changing fishing lines that have been used, or exposed to the elements, for extended periods of time. Frail, tangled, or aging fishing line can compromise the effective working condition of the fishing line thus increasing the chances of possibly breaking under lesser pulling forces. It is quite frustrating to successfully catch a dream fish while fishing only to lose the fish as a result of the fishing line breaking. Fishing line that has been exposed to the sunlight, salt water, or has endured repeated axial tension over time, is often prone to breaking easily under lesser prescribed pulling forces. Therefore, if anglers wish to increase their chances of success in catching fish, it is not only important to keep their tackle in good working order, but to employ fishing line that provides optimum performance when fishing.

The task of changing fishing line on fishing reels can be daunting as it is usually time consuming to not only unwind old fishing line from fishing reels, but to also wind new fishing line onto fishing reels. The effort is further challenging when having to change fishing line on multiple fishing reels. The length of fishing line installed on fishing reels is often determined by the type of fish sought. For example, a smaller amount of fishing line may be used when fishing in streams, or rivers, but a greater amount of line is often used when fishing in deeper waters such as in lakes or oceans. One common practice that is used for changing fishing lines on fishing reels often entails a person pulling on the end of the fishing line until the fishing reel is empty of line. To install new fishing line, the person ties a free end of the new fishing line onto the fishing reel and winds the fishing reel via, the handle, while trying to retain proper position of the retail line spool. Also, some prior art mechanical devices have been employed to either unwind old fishing line from fishing reels, or re-spool new fishing line onto fishing reels but none allow both unwinding and re-spooling fishing line from and onto fishing reels using a single tool. Also, prior art devices do not provide a mechanism for controlled tension when winding, unwinding, or re-spooling fishing line to prevent possible injury to an angler, or damage to a fishing pole or line, as a result of tangles formed in the fishing line. Such tangles can cause snagging or intermittent pulling tension during the winding or re-spooling process causing the fishing pole to bend significantly when unwinding old fishing line, or resulting in the line breaking during the process. Controlled tension of a spool used in unwinding or re-spooling fishing line allows the spool to give or rotate when encountering tangles in the fishing line.

Accordingly, there is an established need for a solution to at least one of the aforementioned problems mentioned herein, and to provide a portable, fishing spool tool that is used to quickly, easily and safely re-spool new fishing line onto any size fishing reel, and to unwind old fishing line from any size fishing reel, in a controlled manner to prevent injury or damage to users or fishing equipment during the process as a result of tangles formed in the fishing line.

SUMMARY OF THE INVENTION

The present invention is directed to a fishing spool tool including a spool comprising a pair of cones mounted onto a rod, a tension spring system including a rod collar, and a tension collar assembly both mounted on the rod on opposite sides of the cones to adjust and set a desired amount of axial tension on the cones to control rotational speed and drag of the spool when adding or removing fishing line, and a pair of suction cups attachable to opposite ends of the rod for installing the fishing spool tool in a receptacle with a ballast to safely re-spool new fishing line on fishing reels.

A first embodiment of the invention provides a fishing spool tool comprising: a rod having a hexagon head at a proximate end of the rod, a first side attachment including a central hub and a bore formed in the central hub, and a second side attachment including another central hub and another bore formed in another central hub, a tension spring system comprising a rod collar including a first collar aperture, and a first thumb screw including a first threaded shank inserted within a hole extending in the first collar aperture, and a tension collar assembly including a tension collar having a second collar aperture, a shaft collar including a collar opening and a second thumb screw including a second threaded shank inserted within another hole extending in the collar opening, a hollow tube extending through the second collar aperture and coupled to the shaft collar, and a compression spring disposed over the hollow tube such that the tension collar selectively moves along an outer surface of the hollow tube to releasably compress the compression spring, a spool including a spool aperture extending through a central region of the spool, and wherein the fishing spool tool is assembled such that the hexagon head of the rod is disposed within the bore of the first side attachment, and a distal end of the elongate rod is inserted through the hollow tube, the spool aperture, the first collar aperture and into another bore of the second side attachment.

In one aspect, the first side attachment includes a first suction cup, and the second side attachment includes another suction cup where the bore of the first suction cup includes a hexagon socket receiving the hexagon head, and the second suction cup includes a tube for receiving the distal end of the elongate rod, and each suction cup includes a magnet.

In another aspect, the spool includes a pair of cones each having a front end and a back end having a larger diameter than the front end, and a cone aperture extending along the central region of each cone where the cone apertures aligned together to define the spool aperture when each front end of each cone are in releasable engagement with each other on the rod.

In yet another aspect, each cone includes a beveled bore that is formed in a central region of the back end. The rod collar and tension collar each include a beveled cone washer to releasably engage with each of the beveled bores of the cones.

In another aspect, one hole includes a threaded channel extending within the rod collar and perpendicular to the collar aperture, and another hole includes another threaded channel that extends within the shaft collar and perpendicular to the collar opening.

In another aspect, the rod collar includes a polyethylene tube disposed within the first collar aperture, and a fiber washer, and the tension collar includes a stainless steel washer and a fiber washer. The rod collar, spring, thumb screws, shaft collar, and rod each comprise stainless steel to prevent rust.

In another aspect, the outer surface of the rod includes knurls formed on designated sections of, or the entire length of, the outer surface of the rod to selectively engage the rod collar and distal end of first thumb screw, and the shaft collar and distal end of the second thumb screw.

In another aspect, the fishing spool tool is attachable within a receptacle storing a ballast such that the first suction cup and the second suction cup are releasably attachable to an inner surface of the receptacle storing a ballast comprising water where the spool is partially disposed in the water when the suction cups are attached to the inner surface of the receptacle. In one embodiment, the receptacle includes a bucket.

In another aspect, the distal end of the rod is releasably retained in a chuck of a power drill, where the power drill is selectively operated to rotate the rod and the cones together when the rod collar is securely affixed in position on the shaft and axially compressing the cones against the compression spring of the tension collar assembly.

In yet another aspect, the pair of cones includes a circular sidewall disposed about the back end of each cone where each of circular sidewall comprise a diameter that is larger than the diameter of each back end of each cone.

In another aspect, the spool includes a first spool hub including a circular sidewall and a first inner hub having a hub aperture, a second spool hub including another circular sidewall and a second inner hub having another hub aperture, and an inner sleeve, where the first spool hub and the second spool hub are each disposed over the inner sleeve and coupled together so that the hub apertures align together to define the spool aperture.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed to a fishing spool tool for unwinding old fishing line from fishing reels, winding new fishing line onto a spool from retail spools packaged with new fishing line, or re-spooling new fishing line onto fishing reels where the fishing spool tool includes a spool tension system to control rotation of the spool during the process.

Figure 1:
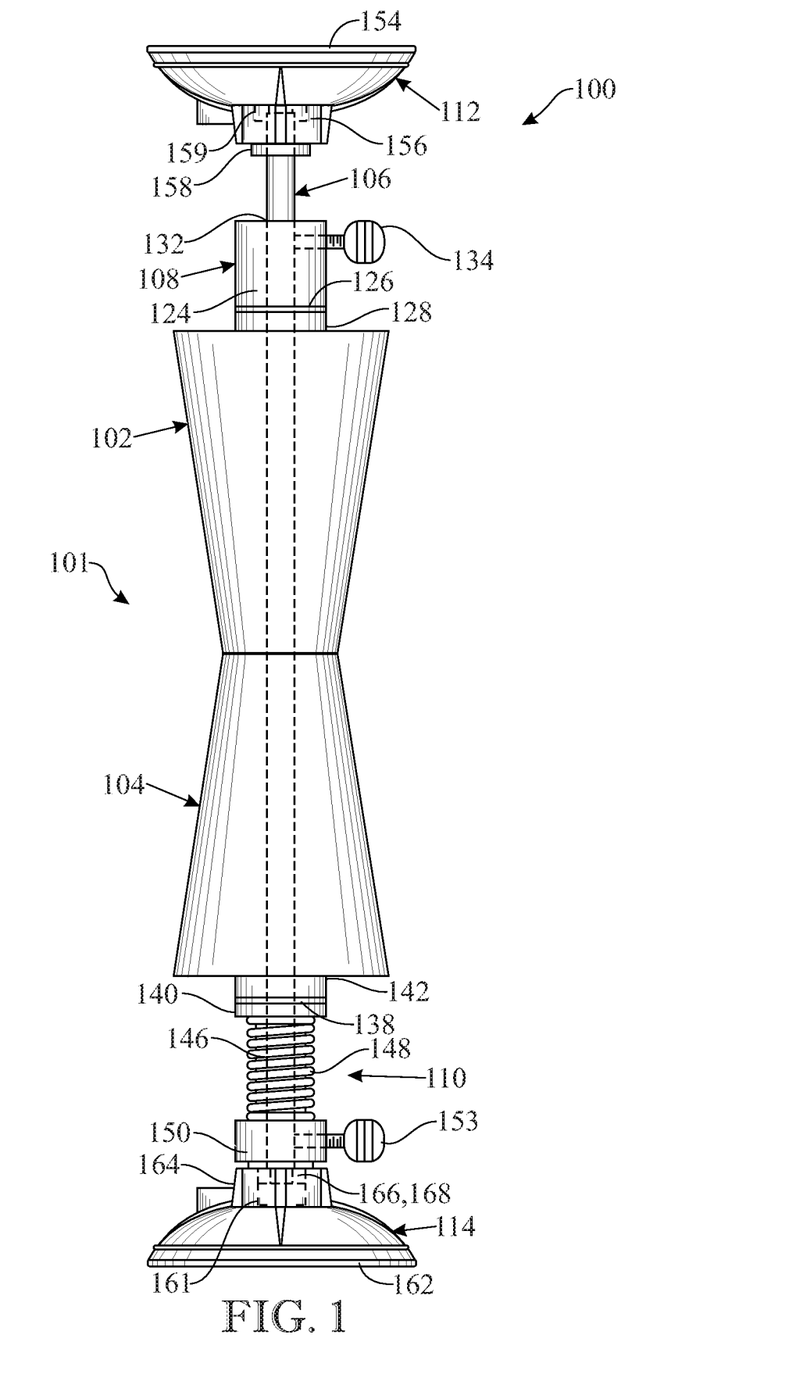
FIG. 1 presents a top view of a fishing spool tool, showing a spool comprising two cones mounted on a rod, a pair of collars mounted on the rod on opposite sides of the two cones, and side attachments including suction cups removably attached to opposite ends of the rod, in accordance with an embodiment of the present invention.
Figure 2:
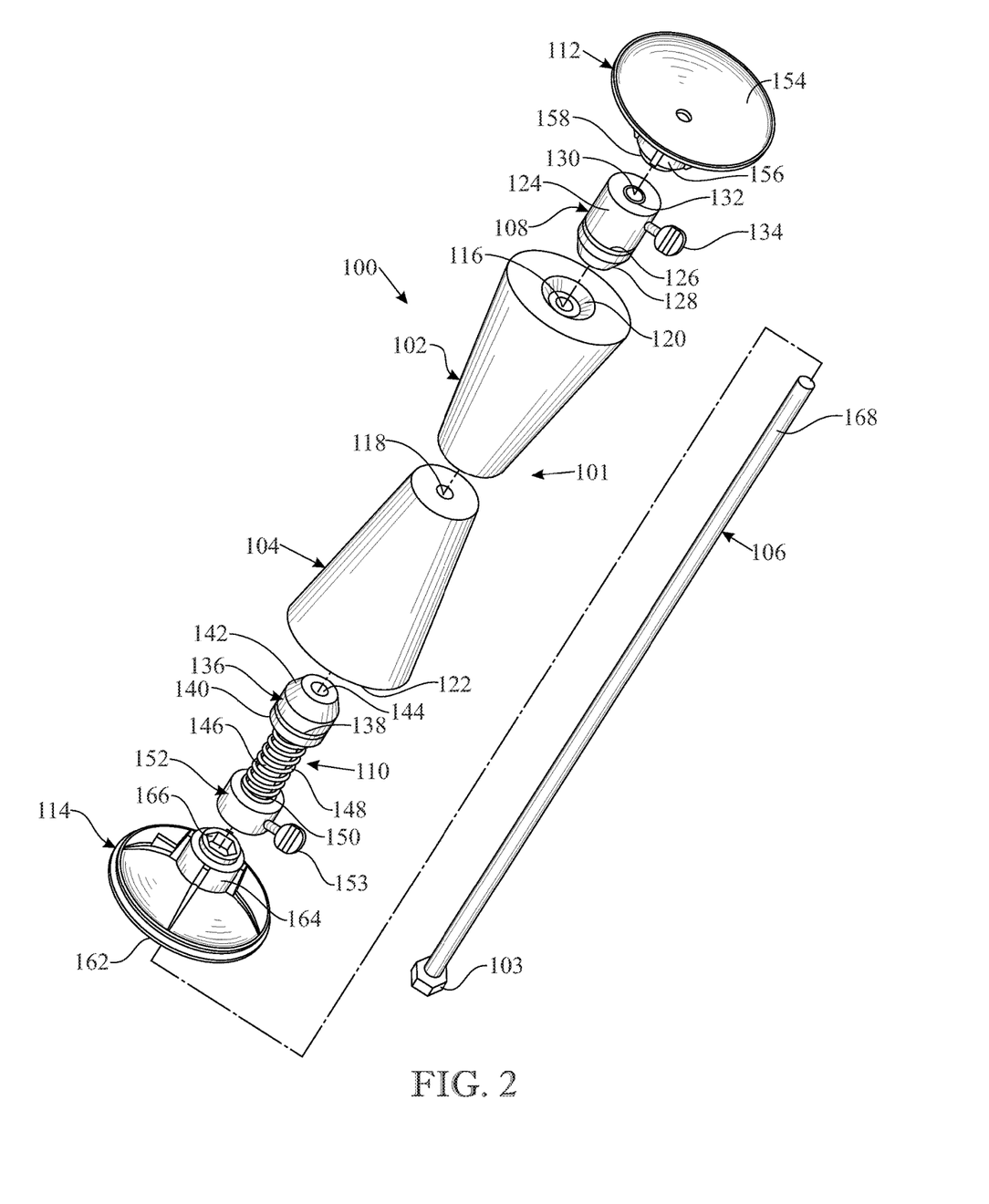
FIG. 2 presents an exploded view of the fishing spool tool of FIG. 1, showing the cones separated, each collar including beveled cone washer to engage beveled bores provided within an end wall of each cone, and the rod including a hexagon head readily inserted into a hexagon bore provided in one suction cup.

Referring now to figures wherein like elements are represented by like numerals throughout, there is shown in FIGS. 1 and 2, a top view, and an exploded view, respectively, of a fishing spool tool 100 for winding old fishing line from, and re-spooling new fishing line on, any size fishing reel in a controlled manner, in accordance with an embodiment of the present invention. The fishing spool tool 100 includes a spool 10 comprising two cone members 102, 104 that are mounted on an elongate rod 106, a spool tension system including a rod collar 108, and a tension collar assembly 110 each mounted on the rod 106 at opposite sides of the cone members 102, 104, and side attachments 112, 114 that are removably attached to opposite ends of the rod 106 to retain the fishing spool tool 100 in position when rewinding new fishing line onto fishing reels. The rod 106 comprises an elongate body having a round geometrical shape dimensioned to include a predetermined length and diameter. Because the spool tool 100 will be used in either fresh or salt water, the rod 106 is preferably constructed from a stainless steel or galvanized metal. The rod also includes a hexagon head 103 provided at one end of the rod mechanically attach to a side attachment 114. In one embodiment, the rod 106 includes knurls that are formed on the outer surface of the rod 106 where the knurls can be disposed along the entire length of the rod 106, or at designated sections or portions on the rod 106.

The spool 101 includes a pair of cones 102, 104 that each include a cone-shaped body having a front diameter, and a back diameter that is larger than the front diameter, and a predetermined length. In one non-limiting embodiment, the outer surface of each cone 102, 104 comprises a smooth finish but may include grooves, ridges, or other formations. Each cone 102, 104 includes an aperture 116, 118 that extends completely through the central region of the cone body to accommodate inserting the rod 106. The apertures 116, 118 are diametrically shaped and sized to correspond to the shape and size of the rod 106 and permit each cone 102, 104 to slide freely on, and rotate around, the rod 106. A beveled bore 120, 122 is provided at one end of each cone 102, 104 to engage beveled cone washers 128, 142 provided on collar 112 and 114, respectively. It is appreciated that each cone 102, 104 comprise a solid, dense body, or include cones having hollowed sections. It will also be appreciated that each cone 102, 104 may include a locking engagement comprising a male/female connection configured to force the cones 102, 104 to rotate together as a pair and not independently of each other.

The fishing spool tool 100 includes a spool tension system comprising a rod collar 108, and a tension collar assembly 110. The spool tension system is implemented to permit users to set a desired amount of tension on the spool 101 when unwinding or re-spooling fishing line. Thus, users can set a particular amount of drag or slippage for the spool 101. The rod collar 108 includes a collar body 124, a fiber washer 126, and beveled cone washer 128 disposed at the distal end of the collar body 124. The rod collar 108 also includes a collar aperture 130 that extends through the central region of the collar body 124 and a polyethylene tube 132 is disposed within the collar aperture 130 to reduce frictional contact with the rod 106 when inserted through the collar aperture 130. The polyethylene tube 132 is molded at both ends to retain assembly of the rod collar 108 allowing the collar body 124, fiber washer 126, and beveled cone washer 128 to rotate freely around the tube 132. As illustrated in FIG. 2, the beveled cone washer 128 is tailored to fit into the beveled bore 120 of cone 102 when the spool tool 100 is assembled together. The fiber washer 126 allows the beveled cone washer 128 to rotate freely around the tube 132. A thumb screw 134 includes a threaded shank disposed within a threaded hole or channel extending, perpendicular through the cylindrical body 124 and into the collar aperture 130. The thumb screw 134 is selectively rotated to engage the tip of the threaded shank to the outer surface of the rod 106 to maintain the cones 102, 104 in compressed axial, position against the tension collar assembly 110. In one non-limiting embodiment, the outer surface of the rod 106 may include a rough or textured finish or include knurls, grooves, ridges, dimples, or indentations to permit the rod collar 108 to firmly grip the outer surface of the rod 106 in the event the thumb screw 134 becomes slightly loose. In an alternative embodiment, the rod 106 may be totally or partially coated with a rubber or textured coating material, or include one or more textured sleeves that are removably disposed on the rod 106 to permit the rod collar 108 to firmly grip the outer surface of the rod 106.

The tension collar assembly 110 includes a tension collar 136 including a fiber washer 138, a collar washer 140, and a beveled cone washer 142 that is provided at one end of the collar 136. The beveled cone washer 142 is diametrically configured to fit within the beveled bore 122 of the cone 104 when assembled, similar to engagement of beveled cone 128 with beveled bore 120 of cone 102. A collar aperture 144 extends through the central region of the tension collar 136. A polyethylene tube 146 is disposed within the collar aperture 144 to reduce frictional contact with the rod 106 when inserted through the collar aperture 144, and to permit the tension collar 136 to rotate freely around the tube 146. The tube 146 extends from the tension collar 136 into a collar opening 150 provided in a shaft collar 152. The polyethylene tube 146 is molded at both ends to retain assembly of the tension collar 136 and shaft collar 152 on the tube 146. A biasing member, such as a compression spring 148 is disposed over the polyethylene tube 146 and operatively retained between the tension collar 136 and the shaft collar 152. A thumb screw 153 includes a threaded shank that extends within a hole or channel formed perpendicular within the body of the shaft collar 152 and extends into opening 150. The thumb screw 153 is rotated to engage the tip of the threaded shank to the outer surface of the rod 106 to retain the shaft collar 152 in place while providing axially compression on cones 102, 104, via, compression spring 148, when selectively adjusting rotational tension on, and movement of, the spool 101. It will be understood that collar 108, 136, and 152 may be constructed from any of metal, plastic, or a hard resin. In a preferred embodiment, the materials employed for construction should accommodate functional use in fresh or salt water applications, and as such factors such as rust, that may compromise the functional attributes of the tool 100, should be considered. With this in mind, some materials may include stainless steel, galvanized steel, brass, and of course certain durable, hard, non-brittle, plastics.

The compression spring 148 can be coated with a water resistant or corrosion free material, or the spring itself can be constructed from a galvanized metal or stainless steel material to resist rust. It is contemplated that the load and spring rate characteristics of the compression spring 148 are designed and selected to provide axial compression of cones 102, 104 to adjust rotational drag or slippage of spool 101. As such, the amount of force needed to axially compress the cones 102, 104 against the rod collar 108 to adjust rotational tension of the spool 101 is determined by the load and spring rates or values formulated when fabricating or selecting the compression spring 148. It will be understood that compression spring 148 may comprise one or more compression springs of the same or different spring load or spring rate values.

Figure 5:
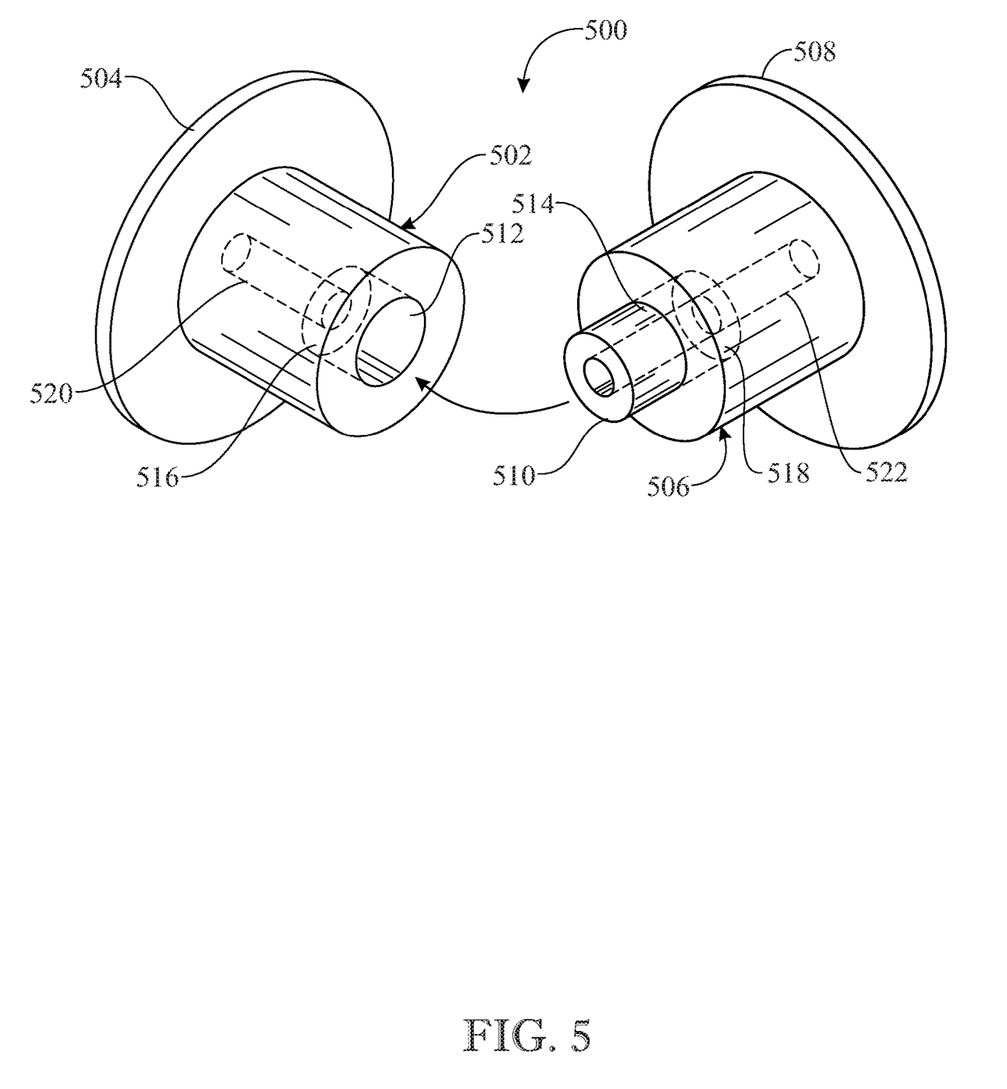
FIG. 5 presents a perspective view of a fishing spool, showing a pair of cones, each cone including a sidewall at one end of the cone, in accordance with an alternative embodiment of the present invention.

With continued reference to FIGS. 1 and 2, the fishing spool tool 100 includes a pair of side attachments 112, 114 that in one embodiment, each comprise a suction cup for removably attaching the fishing spool tool 100 securely within a receptacle as shown in FIG. 5. A first suction cup 112 includes a suction base 154 having a central hub 156 integrally formed with the base 154 where the central hub 156 includes a short, polyethylene tube 158 that is separately disposed within, or integrally molded with, the central hub 156, as better illustrated in FIG. 2. A small magnet 159 is imbedded, encased, or enclosed within, beneath, or adjacent to, the central hub 156. The tube 160 is sized and dimensioned to receive a distal end of the rod 106, and the distal end 168 of the rod 106 is releasably attached within the tube 160 and central hub 156, via the magnet 159. As such, the end 168 of the rod 106 is removably attached within the tube 160 via, both by friction and magnetic attraction forces between the magnet 159 and distal 168 end of the rod 106.

A second suction cup 114 includes a suction base 162 having a central hub 164 integrally formed with the base 162. The central hub 164 includes a hexagon socket 166 to accommodate the hexagon head 103 of the rod 106. The mechanical connection of the hexagon head 103 and hexagon socket 166 prevents the rod 106 from rotating within the hub 164 when using the fishing spool tool 100 to wind and unwind fishing line. It will be understood that the socket 166 may be formed within the central hub 164 as a single part, or alternatively, include a separate and distinct component that is securely affixed within the hub 164 using any well-known gluing, welding, or plastic welding techniques. Another magnet 161 is also imbedded, encased, or enclosed within, beneath or adjacent to the central hub 164 to permit magnetic attachment of the hexagon head 103 of the rod 106 within the hexagon socket 166. It is understood that although a preferred embodiment includes side attachments 112, 114 comprising suction cups, other attachments may be employed such as, but not limited to, the use of bolts and nuts, magnets, or clamps. Also, the hexagon head 103 of the rod 106 may comprise a star-shaped head, a gear-shaped head, a cross-shaped head, or simply comprise a threaded end that extends out from a hub aperture formed through the side attachment 114 where and nut is threaded onto the threaded end of the rod 106.

In assembling the fishing spool tool 100, the hexagon head 103 of the rod 106 is inserted within the hexagon socket 166 of the suction cup 114 to prevent the rod 106 from rotating during use, and the magnet 161 releasably retains the hexagon head in place in the socket 166. The distal end of the rod 106 is inserted into the tube 146, extends out the collar aperture 144 of the tension collar 136, through apertures 116, 118 of cones 102, 104, through the collar aperture 130 of the rod collar 108, and into the collar hub 156 and tube 160 of the first suction cup 112, where the magnet 159 releasably retains the distal end 168 of the rod 106 in place, as provided in FIG. 1. In assembly, both beveled cone washers 128, 142 engage the beveled bores 120, 122 provided in the end walls of each cone 102 and 104, respectively, and rotate freely, under compressed tension against fiber washers 126, 138, and around respective tubes 132, and 146. The shaft collar 152 is set on the rod 106 and the thumb screw 153 is rotated to retain the shaft collar 152 in place. The rod collar 108 is slid down the rod 106 to compress the cones 102, 104 against the beveled cone washer 142 and spring 148 of the tension collar assembly 110. In doing so, as the axial force pushed against the compression spring 148, the end of the polyethylene tube 146 extends slightly within the aperture 122 of the cone 104.

Figure 3:
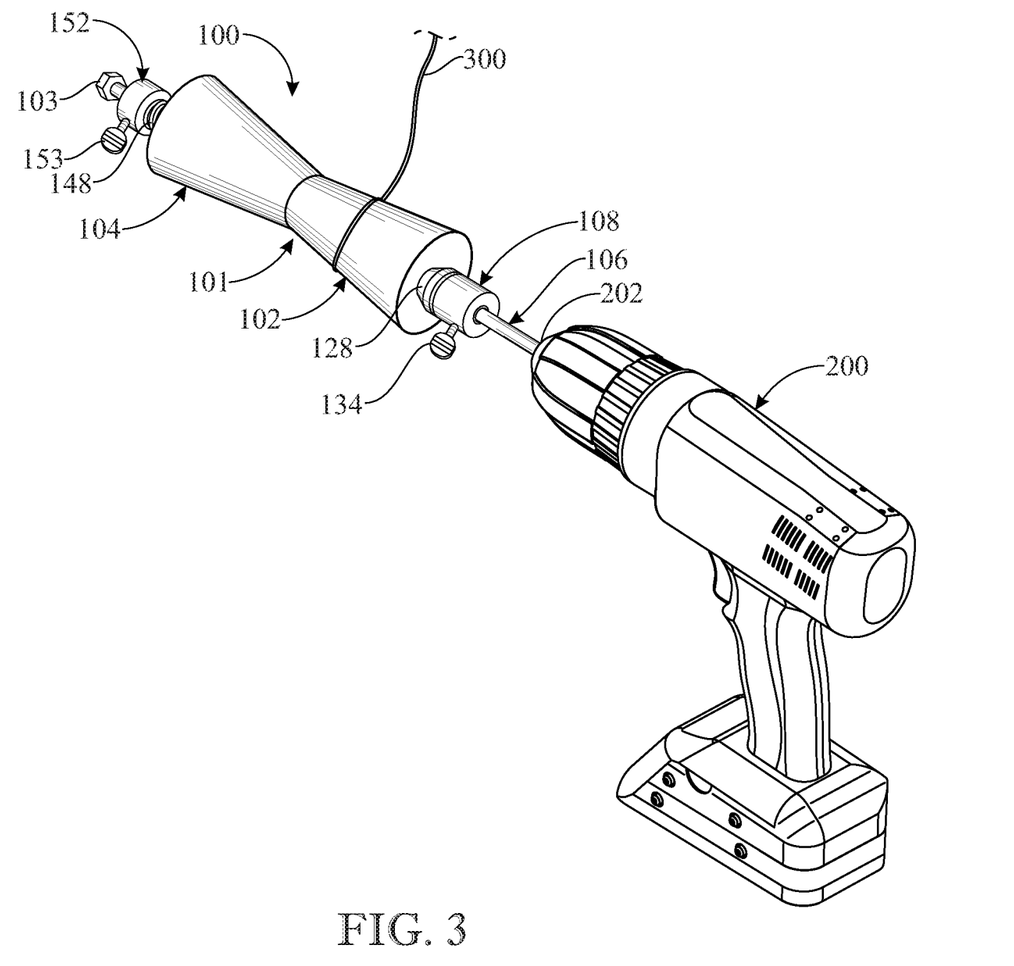
FIG. 3 presents a perspective view of the fishing spool tool of FIG. 1, showing a power drill removably attached to one end of the rod for rotating the spool to unwind old fishing line from a fishing line reel, or to unwind new fishing line from a retail fishing line spool.

Turning now to FIG. 3, there is shown a perspective view of the fishing spool tool 100, with the suction cups 112, 114 removed, and the distal end 168 of the rod 106 removably attached to a power drill 200 for rotating the spool 101 to unwind old fishing line 300 from a fishing reel (not shown), or to wind new fishing line from a retail spool packaged with new fishing line. In preparing to remove old fishing line 300 from a fishing reel, or new line from a retail spool, the user removes the suction cups 112, 114 from the opposite ends of the rod 106, and rotates thumb screw 134 to loosen rod collar 108 to slightly separate the cones 102, 104 apart a slight distance with the shaft collar 152 securely positioned onto the rod 106 with the thumb screw 153 fully rotated to lock the collar 152 in place. A free end of the old fishing line 300 is inserted between the narrow opening of the separated cones 102, 104, and the cones 102, 104 are compressed firmly together by sliding and pushing down the rod collar 108 so that the beveled cone washer 128 engages the beveled port 120 of cone 102 to firmly push the cones against the force of the compression spring 148 of tension collar assembly 110. The user tightens the thumb screw 134 tightly to lock the rod collar 108 in place onto the rod 106 maintaining axial force at all times on the cones 102, 104 against the spring 148 and wedging the fishing line in place. The distal end 168 of the rod 106 is inserted in the drill chuck 202 provided on the end of the drill 200 and the drill 200 is powered to rotate the spool 101 unwinding old fishing line 300 from a fishing reel. It will be understood that amount of drag or slip that the spool 101 incurs is based on the axial compression force applied on the spool 101 by the rod collar 108 and spring 148. As such, positioning the rod collar 108 closer to the tension collar assembly 110 provides greater axial force, via, compression spring 148 to slow rotational speed of the cones 102, 104 around the rod 106. Thus, as shown, adjusting the rod collar 108 along the axial body of the rod 106 correlates to the degree at which the spring 148 is compressed, and thus to the amount of free rotational movement of the cones 102 and 104. The greater the spring 148 is compressed the less the spool 101 can rotate freely around the rod 106. The degree of compression of spring 148 corresponds to the location of the rod collar 108 on the rod 106. As such, the rod collar 108, and tension collar assembly 110 provide a spool tension system for increasing or decreasing the speed or ease of rotational movement of the spool 101, via cones 102 and 104. This feature is beneficial because users can adjust the rod collar 108 to permit controlled rotation of the spool 101 to prevent the old fishing line 300, or a fishing rod holding the old fishing line 300 from breaking as a result of tangles associated with the old fishing line 300, or as a result of the old fishing line 300 catching on something during the unwinding process. Once the old fishing line 300 is completely wound onto the spool 101, the user simply removes the tool 100 from the drill 200, rotates the thumb screw 134 to loosen the rod collar 108, and slides both cones 102, 104 off the distal end 168 of the rod 106 to separate the cones 102, 104 and allow the bundle of wound old fishing line 300 to slide off the cones 102, 104 with each for discarding or recycling the bundled old fishing line 300.

Figure 4:
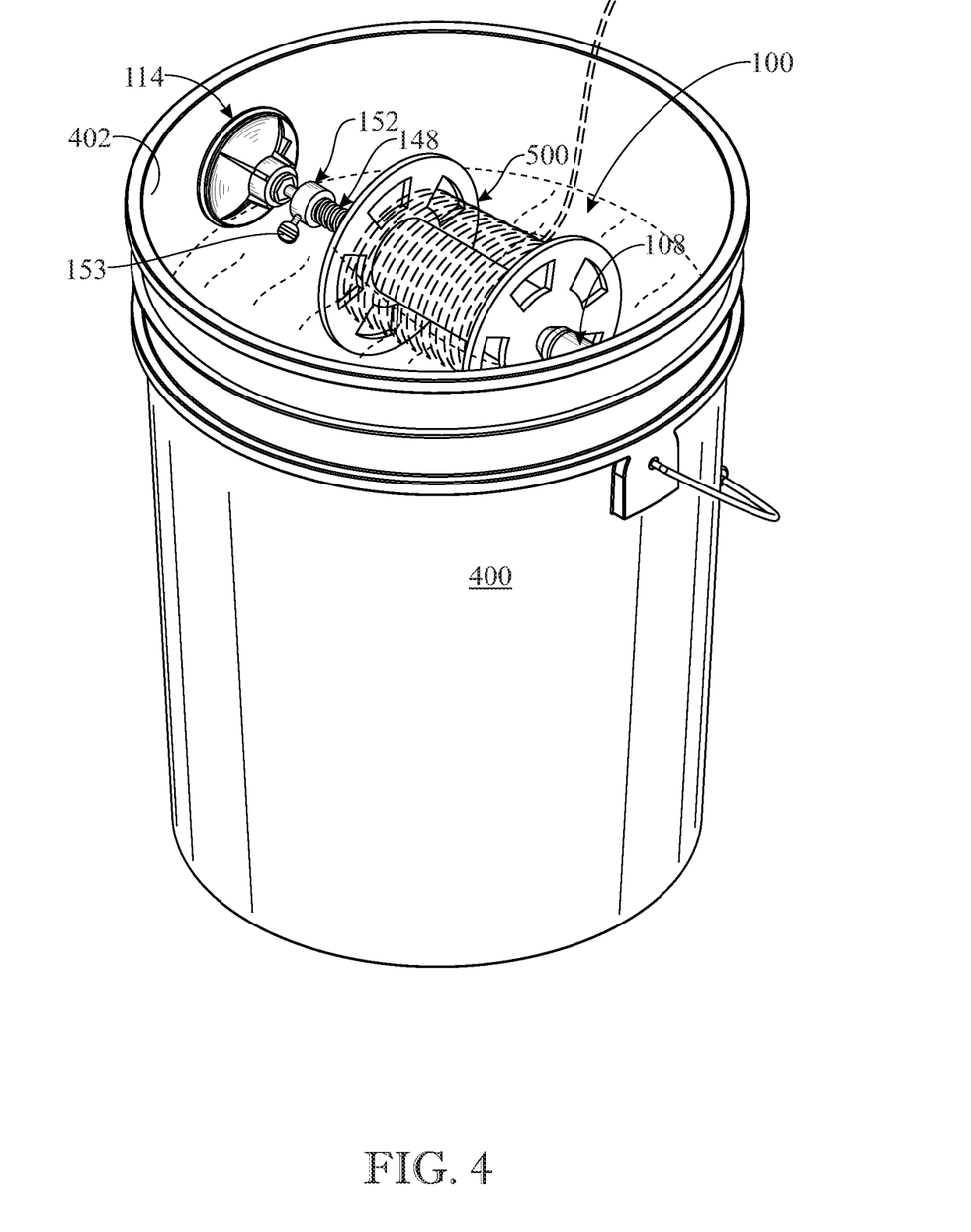
FIG. 4 presents a perspective view of the fishing spool tool of FIG. 1, showing the fishing spool tool removably installed within a bucket of water to provide controlled winding of the spool when re-spooling new fishing line onto fishing reels.

Referring now to FIG. 4, there is shown a perspective view of the fishing spool tool 100 removably installed within a receptacle 400 containing a ballast for controllable, re-spooling of new fishing line, shown in phantom lines, onto a fishing reel (not shown). The fishing spool tool includes all the same features as that shown in FIGS. 1 and 2, with the exception of a different spool 500 as better illustrated in FIG. 6. In one exemplary function, the fishing spool tool 100 can be used to initially wind new fishing line from a retail spool packaged onto the spool 500 using the method described in accordance with FIG. 3. Once the new fishing line is completely wound onto the spool 500, users can easily transfer the new fishing line onto a fishing reel of a fishing pole. In one preferred embodiment, the receptacle 400 includes a 5-gallon bucket including a handle for easily transporting the bucket. The receptacle 400 is filled with a ballast which in one embodiment contains fresh or salt water that can be easily filled in the bucket 400 by simply scooping water from a local body of water or from a fountain or hose. The spool 500 is centered on the rod 106 with both the rod collar 108 and tension assembly 100 set accordingly on opposite sides of the spool 500. The beveled cone washers 128, 142 can spin along with the spool 500 although under a set tension as the compressed spring 148 from the tension collar assembly 110 causes frictional rotation between the cone washers 128, 142 and respective fiber washers 126, and 138. Each suction cup 112, 114 is attached to opposite ends of the rod 106 via, magnets 159 and 161. The fishing spool tool 100 is then installed within the bucket 400 so that each suction cup 112, 114 is firmly, releasably attached to the inner surface 402 of the bucket wall retaining the fishing spool tool 100 in place. As shown, the spool 500 is partially disposed in the water. The intended purpose of the ballast water is three-fold. First, the ballast water is used to cool the fingers of a user when the use is holding the fishing line between their fingers and thumb as the fishing line unwinds from, or winds on, the spool 500. Second, the ballast water provides a medium to retard or slow rotational speed of the spool 500 around rod 106 during the unwinding or winding process, and third, the ballast water provides the added weight for holding and securing the receptacle 400 in place on a horizontal surface during use.

The free end of the new fishing line is attached to a fishing reel. The user rotates the handle of the fishing reel and begins winding the new fishing line onto the fishing reel while unwinding the new fishing line from the spool 500 in a controlled manner that is governed by both the spool tension system of the rod collar 108, and tension collar assembly 110, and the water in the bucket 400. The user typically holds the new fishing line between the fingers and thumb to help guide and steady the line that is winding on the fishing reel. Since the spool 500 is partially disposed in the water, the new fishing line remains cool to the touch as is passes through the user's fingers. The water also provides a dense medium to provide drag to the spool 500 during the process. The freedom of rotation of the spool 500 around the rod 106 is also controlled by compression forces of the spring 148 as well. The axial compression of the spool 500 against the tension collar assembly 110 is dispositive of the position of the rod collar 108. As such, controlled rotation of the spool 500 is achieved by the locked position of the rod collar 108 on the rod 106, the amount of axial compression imposed on the spool 500 against the compression spring 148, and the fluid density of the water in the receptacle 400.

Figure 6:
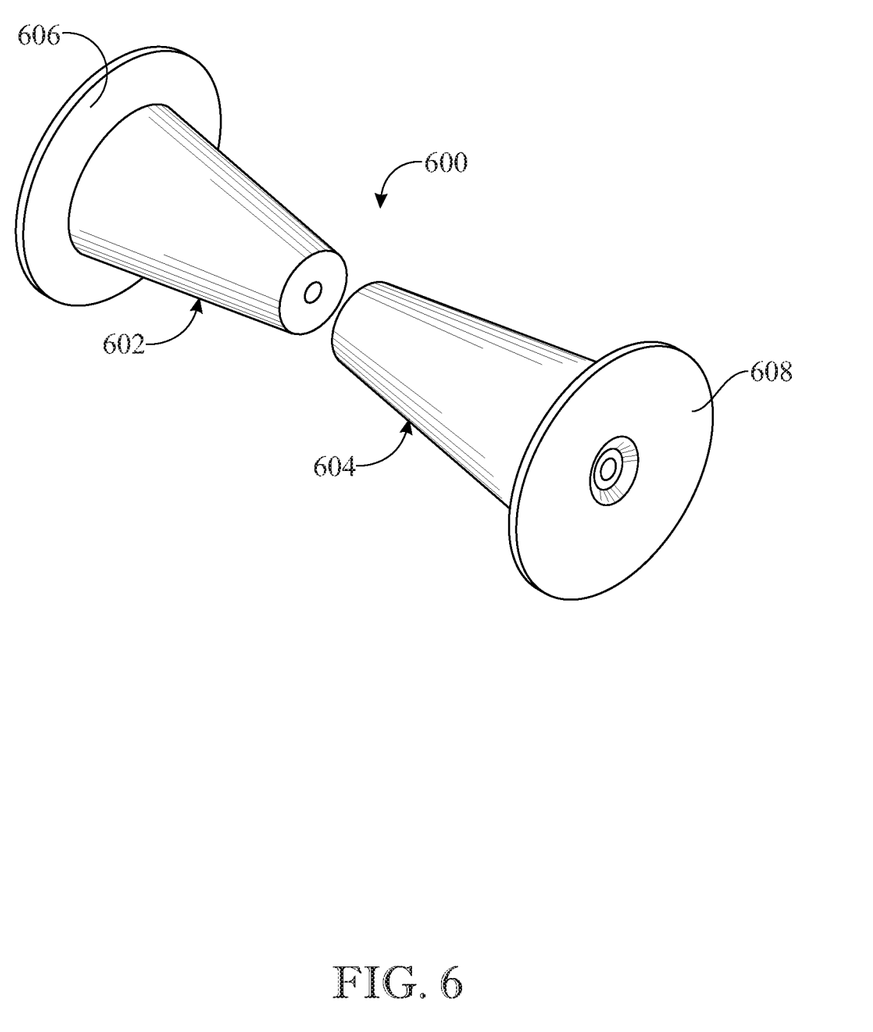
FIG. 6 presents a perspective view of a fishing spool, showing a first spool hub attachable to a second spool hub, via, an inner sleeve, in accordance with an another embodiment of the present invention.

It will be understood that although the receptacle 400 is shown as a bucket, any receptacle capable of holding a quantity and volume of water and securely receiving the tool 100 and spool 500 therein may be used. The receptacle 400 may be round, square, oval, or rectangular. It is appreciated that the rod 106 may comprises a telescoping rod to accommodate attaching the fishing spool tool 100 within receptacles 400 having different dimensional widths, or diameters. Also, it is contemplated that the spool 500 be replaced with either spool 101, or with spool 600 as shown in FIG. 6. The fishing spool tool 100 can be used with interchangeable spools 101, 500, and 600.

An alternative embodiment of a spool 500 adapted for use with the fishing spool tool 100 is better illustrated in FIG. 5. A fishing spool 500 generally comprises a first spool hub 502 having a first sidewall 504 provided at one end, a second spool hub 506 having a second sidewall 508 provided at one end, and an inner sleeve 510 used to attach both spool hubs 502, 506 securely together forming a single spool 500. Each spool hub 502, 506 generally comprises a predetermined diameter and length, a hub opening 512, 514, and an inner hub 516, 518 including an inner hub aperture 520, 522, represented by dotted lines and disposed within the central region of the hub openings 512, and 514. The inner sleeve 510 comprises a cylindrical body having a diameter that is slightly smaller than the diameter of each hub opening 512, 514, and a length equal to or smaller than, the combined lengths of both spool hubs 502, and 506. To attach both spool hubs 502, 506 together, a first portion of the inner sleeve 510 slides into the hub opening 514 of the spool hub 506, and another portion of the sleeve 510 slides into the hub opening 512 of the spool hub 502 where both spool hubs 502, 506 are joined and held together on sleeve 510 via, friction to form a single spool 500 in which the inner hub apertures 520, 522 align together to provide a single aperture for receiving the rod 106 through. It is contemplated that the spool hubs 502, 506 may comprise a variety of different sizes, and lengths for use in winding and unwinding fishing lines that comprise different diameters and lengths. Each sidewall 504, 508 is provided a one end of each spool hub 502, 506. The sidewalls 502, 506 each comprises a diameter that is larger than the diameter of the spool hub 502, 506 and may be formed integral with, or be separately attached to, the ends of spool hubs 502 and 506.

Turning now to FIG. 6 there is shown a perspective view of a spool 600 in accordance with an alternative embodiment of the present invention. The spool 600 is identical to cones 102, 104 of spool 101 shown in FIG. 2, with the exception of sidewalls 606, 608 provided at the larger diameter ends of the cones 602, and 604. Each sidewall 606, 608 generally comprises a circular formation having a diameter that is greater in size than the large diameter ends of the cones 602, and 604. Each sidewall 606, 608 is attached separately to, or formed integral with, respectively ends of cones 602, 604, and extend perpendicular to the lateral surface of the cone 602, 604. The cones 602, 604 may comprise a solid or hollow body. It will be appreciated that holes may be formed within each of the sidewalls 606, 608 to help reduce weight, and allow dispersal of water accumulating on the cones 602 and 604. During use, the sidewalls 504, 508, 606, 608, of each spool 500 and 600, respectively, held guide the new and old fishing line from or onto the spools 500, 600 during winding and unwinding fishing line, and also prevents the fishing line from sliding off the hubs 502, 506, or cones 602, 604 possibly entangling with the mechanical parts of the fishing spool tool 100 during the process.

The fishing spool tool 100 is configured to easily and effectively unwind old fishing line from fishing reels, to unwind new fishing line from retail fishing line spools, and to re-spool new fishing line onto any size fishing reels. The fishing spool tool 100 includes a spool tension system including a rod collar 108, and tension collar assembly 110 to selectively control rotation of the spool 101, 400 or 500, during use to prevent breaking the fishing line, and/or part of a fishing rod as a result of one or more tangles present in the old or new fishing line. Alternative embodiments of spools 101, 400, and 500 are provided for use with a variety of different fishing line winding, re-spooling, and unwinding applications. The fishing spool tool 100 may include a variety of additional features without departing from the scope of the invention such as including marks or indicia on the outer surface of the rod 106, and outer surface of the body 124 of the rod collar 108, to indicate where to position the rod collar 102 along the rod 106 to achieve a predetermined amount of spring compression via, spring 148 to provide measured drag or slippage of spools 101, 400, and 500. Also, the fishing spool tool 100 may employ one or more metal or nylon bearings to promote or enhance rotation of the spools 101, 400, and 500 freely around the rod 106. Also each spool 101, 400, 500 may comprise a single, mold-injected unit with or without sidewalls to reduce the amount of parts or manufacturing steps involved.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A fishing spool tool comprising:
   a rod including a hexagon head at a proximate end of said rod;
   a first side attachment including a central hub and a bore formed in said central hub, and a second side attachment including another central hub and another bore formed in said another central hub;
   a tension spring system comprising a rod collar including a first collar aperture, and a first thumb screw including a first threaded shank inserted within a hole extending in said first collar aperture, and a tension collar assembly including a tension collar having a second collar aperture, a shaft collar including a collar opening and a second thumb screw including a second threaded shank inserted within another hole extending in said collar opening, a hollow tube extending through said second collar aperture and into said collar opening, and a compression spring disposed over said hollow tube, said tube molded at both ends to retain assembly of said tension collar assembly;
   a spool including a spool aperture extending through a central region of said spool; and
   wherein said fishing spool tool is assembled such that said hexagon head of said rod is disposed within said bore of said first side attachment, and a distal end of said rod is inserted through said hollow tube, said spool aperture, said first collar aperture and into said another bore of said second side attachment.

2. The fishing spool tool of claim 1, wherein said first side attachment includes a first suction cup, and said second side attachment includes another suction cup, each suction cup including a magnet situated adjacent each said bore.

3. The fishing spool tool of claim 2, wherein said bore of said first suction cup includes a hexagon socket receiving said hexagon head, and said second suction cup includes a tube for receiving said distal end of said rod.

4. The fishing spool tool of claim 3, wherein said rod collar includes a first beveled cone washer, and said tension collar includes a second beveled cone washer including a cone washer aperture for receiving a portion of said hollow tube.

5. The fishing spool tool of claim 4, wherein said spool includes a pair of cones each having a front end and a back end having a larger diameter than said front end, and a cone aperture extending along the central region of each cone, said cone apertures aligned together to define said spool aperture when each front end of each cone are in releasable engagement with each other on said rod.

6. The fishing spool tool of claim 4, wherein said one hole includes a threaded channel extending within said rod collar and perpendicular to said collar aperture, and said another hole includes another threaded channel extending within said shaft collar and perpendicular to said collar opening.

7. The fishing spool tool of claim 4, wherein said rod collar includes a polyethylene tube disposed within said first collar aperture with said first cone washer rotating freely around said polyethylene tube.

8. The fishing spool tool of claim 4, wherein said tension collar includes a stainless steel washer and a fiber washer, said fiber washer directly adjacent said second beveled cone washer.

9. The fishing spool tool of claim 4, wherein said tension collar, said rod collar, said spring, said thumb screws, said shaft collar, and said rod each comprise stainless steel.

10. The fishing spool tool of claim 7, wherein said rod collar includes a fiber washer directly adjacent said first beveled cone washer and disposed on said polyethylene tube.

11. The fishing spool tool of claim 5, wherein each of said pair of cones includes a beveled bore formed in a central region of said back end to engage with each of said first and second beveled cone washer.

12. The fishing spool tool of claim 11, wherein each cone comprises a solid plastic mass.

13. The fishing spool tool of claim 11, wherein said rod includes knurls formed on an outer surface of said rod, said knurls selectively engaging with said rod collar.

14. The fishing spool tool of claim 11, wherein said distal end of said rod is releasably retained in a chuck of a power drill, said power drill selectively operated to rotate said rod and said cones together when said rod collar is securely affixed in position on said rod to axially compress said cones against said compression spring of said tension collar assembly.

15. The fishing spool tool of claim 11, wherein each of said pair of cones includes a circular sidewall disposed about said back end of each cone, each of said circular sidewall having a diameter larger than each of said back end of each cone.

16. The fishing spool tool of claim 2, wherein said first suction cup and said second suction cup are releasably attachable to an inner surface of a receptacle, said receptacle including water such that said spool is partially disposed in said water when said suction cups are attached to said inner surface.

17. The fishing spool tool of claim 1, wherein said hollow tube includes a hollow polyethylene tube having a predetermined length.

18. The fishing spool tool of claim 1, wherein said spool includes a first spool hub including a circular sidewall and a first inner hub having a hub aperture, a second spool hub including another circular sidewall and a second inner hub having another hub aperture, and an inner sleeve, said first spool hub and said second spool hub each disposed over said inner sleeve and coupled together so that said hub apertures align together defining said spool aperture.

19. A fishing spool tool comprising:
a rod having a hexagon head at a proximate end of said rod;
a first suction cup including a central hub, a bore formed in said central hub, and a first magnet disposed beneath said bore, and a second suction cup including another central hub, another bore formed in said another central hub, and a second magnet disposed beneath said another bore;
a tension spring system including a rod collar having a first beveled cone washer, a first collar aperture, and a first thumb screw including a first threaded shank inserted within a hole extending in said first collar aperture, and a tension collar assembly including a tension collar having a second beveled cone washer, a second collar aperture, a shaft collar including a collar opening and a second thumb screw including a second threaded shank inserted within another hole extending in said collar opening, a hollow tube extending through said second collar aperture and coupled to said shaft collar, and a compression spring disposed over said hollow tube;
a spool including a spool aperture extending through a central region of said spool, a first beveled bore formed on one end of said spool, and a second beveled bore formed on another end of said spool; and
wherein said fishing spool tool is assembled such that said hexagon head of said rod is disposed within said bore of said first suction cup, and a distal end of said rod is inserted through said hollow tube, said spool aperture, said first collar aperture and into said another bore of said second suction cup.

20. A fishing spool tool comprising:
a rod having a hexagon head at a proximate end of said rod;
a first suction cup including a central hub, a bore formed in said central hub, and a first magnet adjacent said bore, said bore including a hexagon socket for removably inserting said hexagon head, and a second suction cup including another central hub, another bore formed in said another central hub, and a second magnet adjacent said another bore, said another bore including a tube;
a tension spring system including a rod collar having a first beveled cone washer, a first collar aperture, and a first thumb screw including a first threaded shank inserted within a hole extending in said first collar aperture, and a tension collar assembly including a tension collar having a second beveled cone washer, a second collar aperture, a shaft collar including a collar opening and a second thumb screw including a second threaded shank inserted within another hole extending in said collar opening, a hollow tube extending through said second collar aperture and coupled to said shaft collar, and a compression spring disposed over said hollow tube;
a spool including a spool aperture extending through a central region of said spool, said spool including a first cone having a cone aperture and a first beveled bore formed on one end of said first cone, and a second cone having a cone aperture and second beveled bore formed on one end of said second cone, said cone apertures defining said spool aperture when said cones are mounted together on said rod; and
wherein said fishing spool tool is assembled such that said hexagon head of said rod is disposed within said hexagon socket of said first suction cup, and a distal end of said rod is inserted through said hollow tube, said cone apertures, said first collar aperture and into said tube of said another bore, said rod collar adjustably attached to said rod so that said first beveled cone washer removably engages said first beveled bore, and said second beveled cone washer removably engages said second beveled bore when said rod collar is slideably attached to said rod to releasably compress said spool against said compression spring.

\* \* \* \* \*